No. 861,647. PATENTED JULY 30, 1907.
J. S. GOLDSMITH.
CLEANSING AND DRYING MACHINE.
APPLICATION FILED JULY 10, 1906.
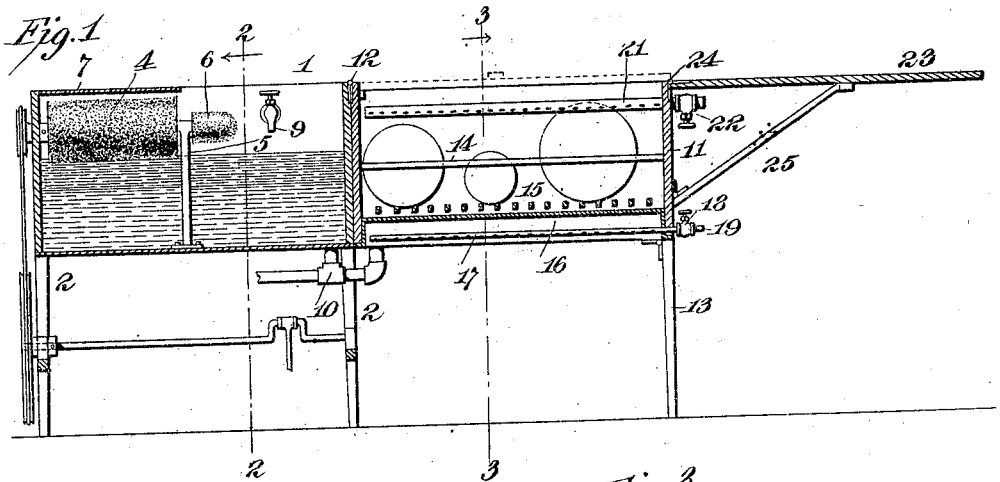
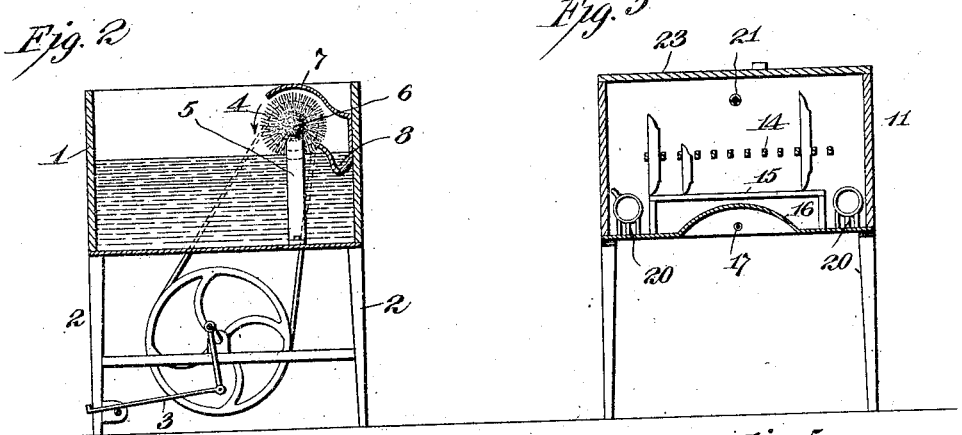
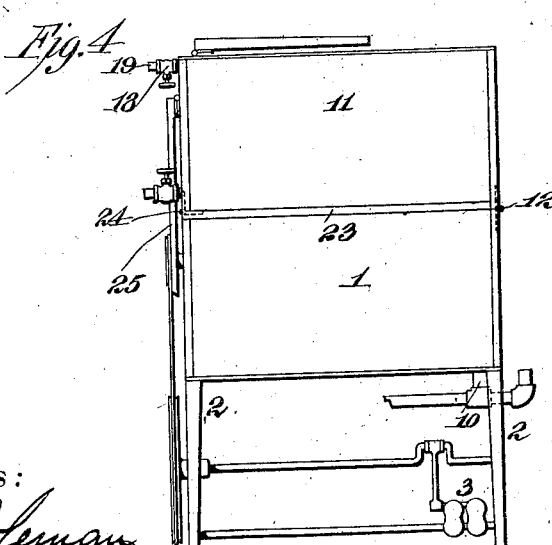
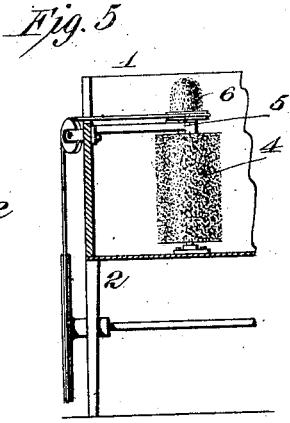
Witnesses:
Jas. F. Coleman
John S. Lobch
Inventor
John S. Goldsmith
By Dyer & Dyer.
Attorneys.

UNITED STATES PATENT OFFICE.

JOHN S. GOLDSMITH, OF NEW YORK, N. Y.

CLEANSING AND DRYING MACHINE.

No. 861,647.　　　　Specification of Letters Patent.　　　　Patented July 30, 1907.

Application filed July 10, 1906. Serial No. 325,483.

To all whom it may concern:

Be it known that I, JOHN S. GOLDSMITH, a citizen of the United States of America, residing in the borough of Manhattan, city of New York, county and State of New York, have invented a certain new and useful Improvement in Cleansing and Drying Machines, of which the following is a specification.

The object I have in view is the production of a cleansing and drying machine for washing china, glass and silverware, particularly adapted for domestic purposes. I seek to provide a machine which will be simple and cheap, which will be portable and which can be folded up when not in use. By my invention I can handle the dishes in bulk, I make it possible to cleanse them more thoroughly than has heretofore been possible, and I can dry them without danger of breaking, and very expeditiously. I attain these objects by the mechanism illustrated in the accompanying drawings, in which Figure 1 is a view, partly in section, of an apparatus embodying my invention, Fig. 2 is a transverse section thereof, taken on the line 2—2, Fig. 1, Fig. 3 is a similar view taken on the line 3—3, of Fig. 1, Fig. 4 is an elevation of the machine folded up, and Fig. 5 is a detail of a modification.

In carrying out my invention I provide a receptacle or tank 1, which is water-tight, and made of wood, metal, soapstone or other suitable material. This receptacle is supported upon legs 2, as shown, so as to be at the proper height for permitting a convenient manipulation of the treadle 3, which works, through the fly-wheel and belt gearing shown, a rotary brush 4. This brush is located within the receptacle 1 and is carried upon a horizontal shaft, as shown. Instead of being carried on a horizontal shaft, the brush may be supported on a vertical shaft, as shown in Fig. 5. An end bearing 5 is provided, and outside of the bearing a smaller brush 6 extends, for the purpose of cleansing hollow ware, i. e., cups and glasses. Above the brush 4 is a shield or guard 7, to prevent splashing, and under the brush is a guard 8 for removing grease from the brush. The guard 8 is adapted to lightly engage with the brush. A cock or faucet 9 is provided for admitting water into the receptacle and a draw-off pipe 10 permits the contents of the receptacle being drawn off. To the receptacle 1 is attached a second receptacle 11 by means of hinges 12, so that the two receptacles will be end to end. This receptacle is provided with legs 13 which may be hinged as shown, so as to be folded down onto the side of the receptacle 11 when the latter is folded over on top of the receptacle 1, as shown in Fig. 4. Within the receptacle 11, is a dish rack 14, below which is a support 15 for supporting the dishes, and plates. The bottom of the receptacle 11 is provided with a recess 16 and within this recess is a pipe 17. This pipe 17 is perforated as shown, and is provided with a valve 18 and a connection 19, for a flexible pipe to be connected with the gas system of the house. The pipe 17 constitutes a gas burner. The walls of the recess 16 are of thin material, capable of resisting flame, and transmitting heat to the interior of the receptacle. Sheet iron or copper may be used for this purpose. On the sides of the support 15 are cup racks 20, which are shown as composed of parallel strips—three in number—the middle one being lower than the others, so that the cups and glasses may rest upon it without danger of being dislodged. A horizontal pipe 21 is supported within the receptacle 11 above the plate rack 14. The pipe 21 is provided with a valve 22 and a connection with a flexible pipe to connect with the cold water supply. The pipe is perforated as shown. This pipe constitutes a means for spraying the dishes and rinsing them.

A suitable cover 23 is hinged at 24 to the receptacle 11, and is provided with a brace 25, so that it may be supported in a horizontal position and will constitute a table for supporting the cleansed and dried plates, dishes, cups and glasses. This cover 23 may be folded over the top of the receptacle 11, as shown in full lines in Fig. 3, and in dotted lines in Fig. 1, so as to entirely inclose the receptacle.

In operating the device, the receptacle 1 is partly filled with hot water, to which may be added soap and other cleansing agents, and the dishes and plates, glass and silverware which are to be cleansed are put within it; the operator standing or sitting in front of the receptacle, by means of the treadle 3, can rotate the brushes 4 and 6. The brush 4 will dip into the water, so that it will always keep wet. By holding the articles against the brush and rapidly rotating the same, the dishes, plates and silverware may be effectively cleansed, as also may be the outside of the cups and other hollow ware. Whatever grease is removed from the dishes will be thrown by centrifugal force against the guard 8 where it will be washed away. As the dishes and other articles are cleansed they are placed within a dish rack 14 or upon the cup supports 20. The dishes are rinsed by admitting water through the pipe 21. The rinsing water will run off through a branch of the outlet 10. The valve 22 is then closed and the valve 18 opened and the gas escaping through the openings in the pipe 17 is then ignited. Upon closing the cover 23, in a few moments the contents of the receptacle 11 will be completely dried. The gas may then be turned off and the articles taken out and placed upon the table formed by the cover 23, which in the meantime has been swung over and supported on the brace 25.

When the device is not in use, it may be folded up, as shown in Fig. 4, the gas and cold water pipes being disconnected, or, if made of flexible material, they need not be disconnected.

The receptacle 1, with the brush and its accessories, may be used alone, and without the receptacle 11, and similarly the receptacle 11, with the rinsing and drying devices, may be used without the receptacle 1.

The parts are preferably so arranged that a person standing in front of the two receptacles 1 and 11 can operate the treadle 3 to rotate the brushes 4 and 6, and will still be in a position to take the cleansed articles, from the receptacle 1 and place them within the plate rack or cup-support 14, without ceasing the operation of the brushes.

By making the apparatus in the form shown, and constructed of the washing receptacle and drying receptacle, with the cover 22 which also constitutes a table, and supporting the structure upon the legs, as shown, a very compact and light device is produced, which when used in connection with flexible pipes for supplying hot and cold water and gas to it, may be moved about.

Having now described my invention, what I claim as new and desire to secure by Letters Patent is:—

1. A cleansing machine having a receptacle for containing water, a brush within the receptacle, means for rotating the brush, a shield above the brush to prevent splashing, and a guard adjacent to the brush for collecting the grease.

2. A cleansing machine having a receptacle, a brush within the receptacle, means for rotating the brush, and a smaller brush carried by and rotated with the first brush and adapted to cleanse hollow ware.

3. In a cleansing and drying machine, the combination with a washing receptacle, and a drying receptacle hinged thereto.

4. In a cleansing and drying machine, the combination with a washing receptacle, of the brush, and a drying receptacle hinged to the washing receptacle, having drying and rinsing means therein.

5. A washing and drying machine, having a drying receptacle, the said drying receptacle having a recessed bottom, and a gas burner below the said bottom, and a plate rack above the bottom and within the receptacle.

6. In a cleansing and drying machine, the combination with a washing receptacle, a drying receptacle hinged thereto and a cover hinged to the drying receptacle, the said cover having a support by means of which it may be converted into a table.

7. In an apparatus of the character described, the combination with a tank wherein the dishes may be scrubbed, of a tank wherein the dishes may be rinsed, the said rinsing tank being hinged to the scrubbing tank so as to be capable of being folded over on the latter.

8. In an apparatus of the character described, the combination with a tank wherein the dishes may be scrubbed, of a tank wherein the dishes may be rinsed, the said rinsing tank being hinged to the scrubbing tank so as to be capable of being folded over on the latter, and means for converting the rinsing tank into a drying receptacle.

This specification signed and witnessed this 2nd day of July, 1906.

JOHN S. GOLDSMITH.

Witnesses:
LEONARD H. DYER,
AUG. LONG.